INVENTOR.
HAROLD W. PRICE
BY

Patented May 20, 1947

2,420,996

UNITED STATES PATENT OFFICE 2,420,996

CLUTCH CONTROL MECHANISM

Harold W. Price, South Bend, Ind., assignor to Bendix Aviation Corporation, South Bend, Ind., a corporation of Delaware Application October 31, 1942, Serial No. 464,129

9 Claims. (Cl. 192—.01)

This invention relates in general to clutches and more particularly to power means for operating the friction clutch of an automotive vehicle.

It is the principal object of the invention to provide a pressure differential operated two stage clutch operating motor controlled by a follow-up valve, one part of said valve being actuated by the accelerator and its degree of movement, during the second stage of operation of said motor, being controlled by an engine operated governor.

Yet another object of the invention is to provide an accelerator and governor controlled power means for operating the friction clutch of an automotive vehicle, said power means being operative to effect a two stage engagement of said clutch, the first stage of engagement being effected by an operation of the accelerator and completed at the same time or a very short time before the opening of the throttle is initiated and the second stage of engagement being controlled by an operation of an engine operated governor.

A further object of the invention is to provide, in an automotive vehicle, a friction clutch control mechanism including a pressure differential operated motor controlled by a two-part follow-up valve housed therein, the operation of said valve, during a certain phase of said operation, being controlled by an engine operated governor and the actuation of said valve being effected by the operation of the accelerator of the vehicle.

Another object of the invention is to provide, in an automotive vehicle, means for operating the control valve of a friction clutch operating pressure differential operated motor, said means including two levers, one of said levers being actuated by an engine operated governor and serving as a stop for the other lever, the latter lever being actuated by the accelerator of the vehicle.

One of the principal objects of the invention is to provide in an automotive vehicle a two-stage friction clutch control mechanism, the operation of said mechanism being effected by the operation of the accelerator of the vehicle and also by the operation of a governor operated by the engine of the vehicle; the mechanism being operative to effect an engagement of the clutch in two stages, the first stage being completed in a relatively short space of time and the second stage being effected as the speed of the engine is being increased, the loading of the clutch plates being directly proportional to the engine speed.

Yet another object of the invention is to provide power means for so operating the friction clutch of an automotive vehicle as to effect the desired acceleration of the vehicle, said power means being in part controlled by an engine operated governor and operative to effect a loading of the clutch plates which is directly proportional to the torque of the engine.

Yet another object of the invention is to provide power means for disengaging and controlling the engagement of the friction clutch of an automobile, said means including a double ended double acting pressure differential operated motor having one of its ends connected, at all times except when the motor is disabled, to a source of vacuum; the operation of said motor being controlled by a follow-up valve housed within the motor and operative to vent the other end of the motor to the atmosphere to effect a disengagement of the clutch and to thereafter control the clutch engaging operation of the motor by controlling the gaseous pressure in both ends of the motor.

A further object of the invention is to provide, in the power plant of an automotive vehicle, a fluid coupling, a selective gear transmission, a friction clutch positioned between the fluid coupling and transmission and comprising clutch springs, a driving plate and a driven plate, and power means for operating said friction clutch including an accelerator and an engine operated governor controlled two-stage pressure differential operated motor, said motor being automatically disabled, to thereby initiate an uncontrolled engagement of the friction clutch, when the transmission has been established in its highest gear ratio setting.

Other objects of the invention and desirable details of construction and combinations of parts will become apparent from the following description of a preferred embodiment, which description is taken in conjunction with the accompanying drawings, in which.

Figure 1:
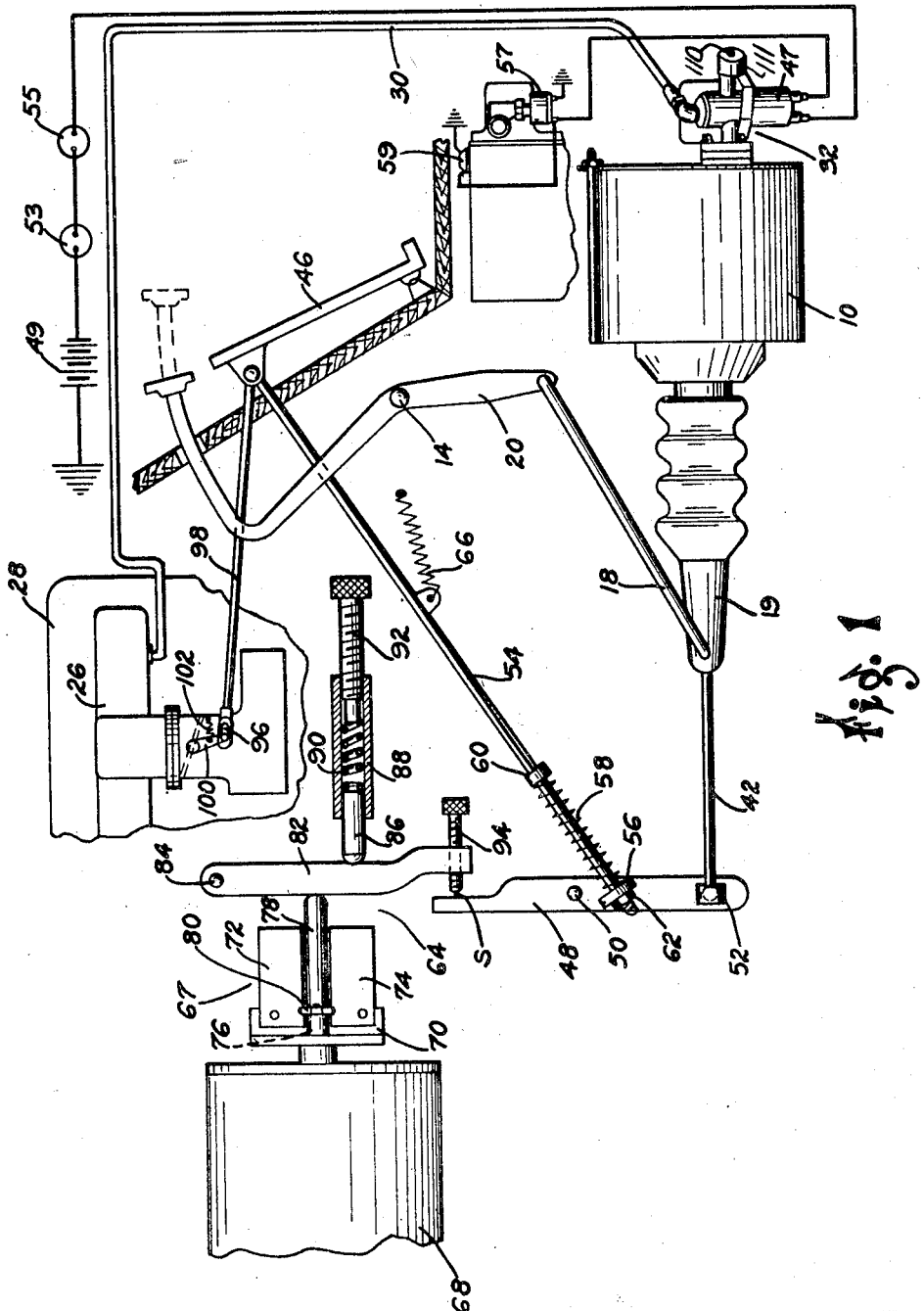
Figure 1 is a diagrammatic view of the clutch controlling mechanism constituting my invention.
Figure 2:
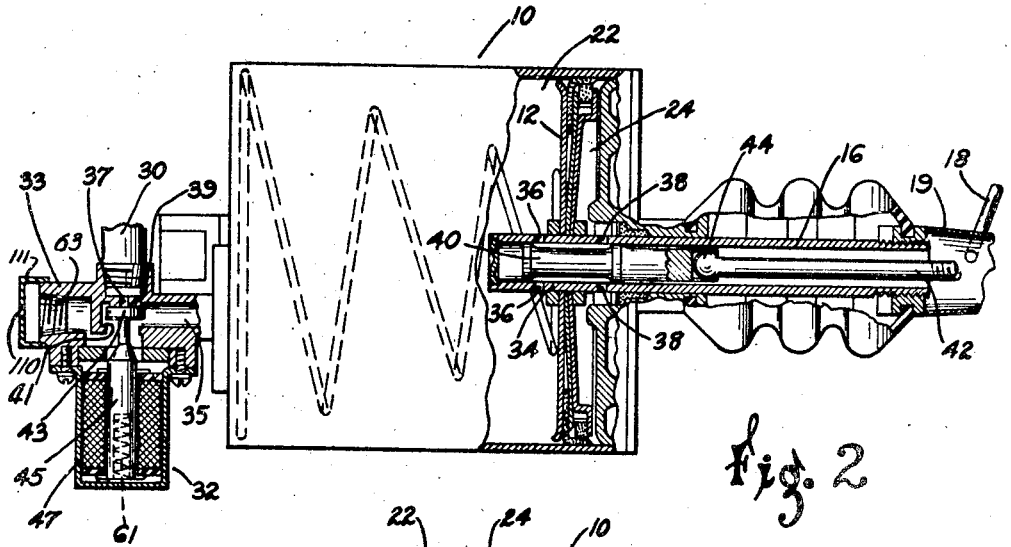
Figure 2 is a view, largely in section, disclosing in detail the clutch operating pressure differential operated motor, the control valve within the motor in its clutch engaging position and the motor disabling cut-out valve mounted on the motor.

Referring now to Figure 2 and Figure 1, the latter diagrammatically disclosing my invention, there is here shown a double-acting double-ended pressure differential operated motor 10 having its power element, preferably a piston 12, operably connected to a friction clutch operating shaft 14 by a hollow rod 16 secured at one of its ends to said piston, a rod 18 pivotally connected to the outer end of a hollow rod 19 secured to the rod 16, and a clutch pedal 20. The piston 12, together with the body and end plates of the motor, provide two motor compartments 22 and 24, the compartment 22 being placed in fluid transmitting connection with the intake manifold 26 of the internal combustion engine 28 by means including a conduit 30. A motor disabling three-way valve mechanism 32 preferably constitutes a part of the fluid transmitting means, said valve mechanism being mounted as a unit on one end of the motor 10. As disclosed in Figures 2 to 4 inclusive, this unit includes a body portion 33 provided with a duct 35 and also provided with a port 37. The inner part of the body portion 33 is shaped to provide seats 39 and 41 for a valve member 43, the latter being mounted upon the upper end of the armature 45 of a solenoid 47 detachably mounted on the above described body portion 33. As disclosed in Figure 1 the solenoid 47 is preferably wired in series with a grounded battery 49, an ignition switch 53, a clutch control cut-out switch 55 and a grounded breaker switch 57, the latter switch being operated by a vehicle speed responsive governor, not shown. The solenoid 47 is also preferably wired to a grounded transmission operated breaker switch 59, both grounded switches 57 and 59 being wired in parallel in the electrical circuits.

Figure 3:
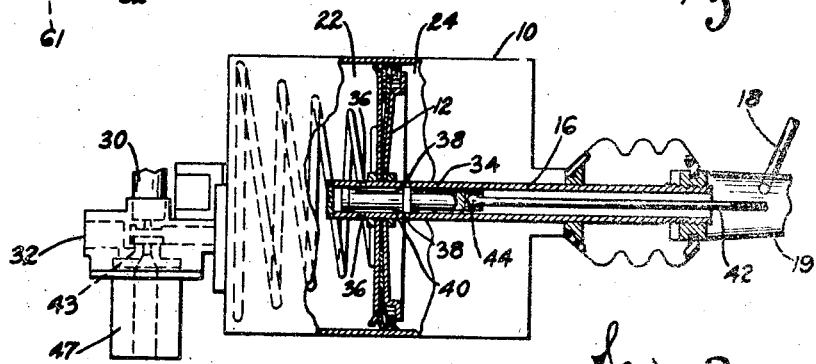
Figure 3 is a view, similar to Figure 2, disclosing the control valve in its lapped position to effect a partial engagement of the clutch.
Figure 4:
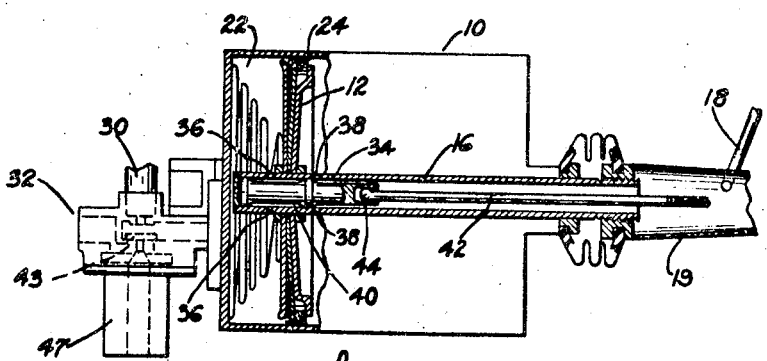
Figure 4 is a view, also similar to Figure 2, disclosing the control valve in its clutch disengaging position.

A two-part valve for controlling the operation of the clutch operating motor 10, known in the art as a follow-up valve, is preferably housed within said motor. Referring now to Figures 2 to 4 inclusive disclosing the details of said valve, the hub portion 34 of the piston 12 constitutes one of the parts of said valve, said part being provided with ports 36 and 38.

The remaining part 40 of the follow-up valve, which is spool-shaped, is slidably mounted within the valve part 34 and is connected to a rod 42 by means of a ball and socket joint 44. The valve part 40 is actuated by force transmitting means connected with the accelerator 46 of the vehicle, said means including a lever 48 pivotally mounted upon a pin 50 secured to some portion of the chassis of the vehicle or part fixedly secured thereto. The remainder of the force transmitting means interconnecting the accelerator and valve part 40 includes the aforementioned rod 42, which is preferably connected to one end of the lever 48 by a ball and socket connection 52, and further includes a rod 54 pivotally connected at one of its ends to the accelerator 46. The rod 54 at its other end slidably extends through a lug 56, fixedly secured to the lever 48; and a compression spring 58, sleeved over the rod 54 and interposed between the lug 56 and a stop 60 secured to said rod, serves to make of the connection between the accelerator and lever a yieldable one. A nut 62, threadedly mounted on one end of the rod 54, serves, together with an accelerator return spring 66, as a means for controlling the degree of compression of the spring 58, for determining the accelerator released position of the valve part 40 and for determining the position of the lever 48 with respect to a stop means 64.

As will be described in greater detail hereinafter the above described force transmitting means interconnecting the accelerator with the reciprocable valve part 40 serves as a means for actuating said valve part and the stop means 64 serves to control the operation of said valve actuating force transmitting means.

Describing now the stop means 64 and the means for actuating the same there is provided an engine operated governor 67 preferably drivably connected to the generator 68 of the power plant, said generator of course being driven by the internal combustion engine 28. It follows therefore that the speed of the governor is directly proportional to the speed of the engine. The governor mechanism includes an angular plate 70 drivably connected to the generator 68 and centrifugal weights 72 and 74 of said governor are pivotally mounted on said plate. The governor mechanism also includes a pin 76 fixedly secured to the center of the plate 70 and a pin 78 recessed in one of its ends and sleeved over the pin 76.

The left end of the pin 78 is provided with a flange 80 which fits within notches in the weights 72 and 74. The pin 78 is at all times in contact with a lever 82 constituting a part of the stop means 64, said lever being pivotally mounted on a stationary pin 84. The lever 82 is at all times in contact with a pin 86, said pin being slidably mounted within a tube 88 fixedly secured in place. One end of the pin 86 abuts a compression spring 90 housed within the tube 88 and the degree of compression of said spring is determined by an adjustable stop 92 threadedly mounted in said tube. Completing the description of the stop means 64 there is provided an adjustable stop 94 threadedly mounted in the lever 82.

Describing now the operation of the clutch controlling power means constituting my invention, and incidentally completing the description of the parts thereof not heretofore described, when the accelerator 46 is released and the internal combustion engine 28 is idling to make of the intake manifold 26 a source of vacuum, there is effected a disengagement of the clutch by the power means. The valve part 40 is then moved, by the operation of the return spring 66, to its clutch disengaged position, that is the position disclosed in Figure 4.

In this position of the valve part 40 the motor compartment 24 is vented to the atmosphere via the hollow rod 16 and the valve ports 38. As disclosed in Figure 4, the other motor compartment 22 is at the time connected to the intake manifold 26 via the duct 35 in the body portion 33 of the disabling or cut-out valve unit 32, the port 37 in said body portion and the conduit 30. This fluid transmitting connection with the intake manifold is made possible by virtue of the fact that valve member 43 is at the time seated at 41, the solenoid 47 being then energized.

Describing this feature of my invention, when the vehicle is at a standstill or is travelling below a certain speed the grounded governor operated switch 57 is closed thereby completing an electrical circuit including the solenoid 47. The solenoid is accordingly energized and the valve member 43 is moved to the position disclosed in Figures 3 and 4, that is the position to interconnect the intake manifold with the motor compartment 22 via the above described fluid transmitting connections. The solenoid 47 is also preferably energized, to effect this vacuum connection between the manifold and compartment 22, in all settings of the transmission except the highest of the gear ratio settings thereof. When the transmission is in the latter setting the grounded breaker switch 59 is opened thereby deenergizing the solenoid 47 and permitting a spring 61 to move the solenoid armature 45 upwardly to seat the valve member 43 upon the seat 39, all as disclosed in Figure 2. It should be added of course that the high gear setting of the transmission is operative to deenergize the solenoid 47 only when the vehicle is travelling at a speed sufficiently high to effect an opening of the governor operated breaker switch 57. This operation of the valve member 43 effects a venting of the motor compartment 22 to the atmosphere via a port 63 in the body portion 33 of the cut-out valve unit 32, the hollow interior of said body portion as disclosed in Figure 2 and the duct 35.

The clutch operating power means of my invention is then inoperative and should the driver wish to shift gears when the vehicle is travelling in high gear and above governor speed it is necessary for him to manually disengage the clutch prior to actuating the means for operating the transmission. It should be noted, however, that with the mechanism of my invention, when the transmission is in its highest gear ratio setting the vehicle will not coast, that is free-wheel, every time the driver releases the accelerator. However, should the driver leave the transmission in high gear and slow down the vehicle the clutch control mechanism will, with the accelerator released, automatically disengage the clutch at the critical governor speed.

The clutch control mechanism of my invention cooperates well with a vehicle provided with a fluid coupling, not shown, interposed in the power plant between the engine and the friction clutch; for such a coupling cooperates well with the two-stage clutch engaging operation of the motor 10 to effect the desired acceleration of the vehicle either from rest or after a shifting of gears when the vehicle is in motion. The fluid coupling constitutes, together with the disclosed clutch control mechanism, a feature of my invention and with this clutch control mechanism the fluid coupling is effective to prevent an undesired deceleration of the vehicle after the transmission has been shifted into high gear; for with this operation the motor 10 is disabled after the high gear setting has been established and the fluid coupling, together with the operation of the accelerator to increase the engine speed, then serves to cushion the shock which would otherwise result from the relatively quick engagement of the clutch.

Continuing now the description of the operation of the clutch control mechanism, and assuming the transmission is in neutral, the engine is idling and the car is at rest, when the accelerator is released to vent the motor compartment 24 to the atmosphere, the piston 12 is subjected to a differential of pressures resulting in its moving to the left to the position disclosed in Figure 4. This operation of the motor 10 disengages the clutch. The driver will then probably operate the transmission to establish the same in a relatively low gear setting and after this operation is completed he will then depress the accelerator to effect an engagement of the friction clutch and an opening of the throttle to speed up the engine and get the vehicle under way.

Describing now the two-stage clutch engaging operation of the motor 10 the first increment of movement of the accelerator serves to take up the lost motion provided by a slot 96 in the end of a link 98 interconnecting the accelerator with a throttle operating crank 100. This crank is normally biased to its throttle closed position by a spring 102. Now this lost motion movement of the accelerator serves, through the intermediary of the yieldable force transmitting connection 54, 56, 58 and 60, to rotate the lever 48 to thereby move the valve part 40 to a position to effect a fluid transmitting connection between the compartments 22 and 24 of the motor 10. When this movement of the valve part 40 is completed, that is the movement effected before the throttle is opened, said valve part takes the position relative to the valve part 34 as disclosed in Figure 2. It is to be noted, however, that at this time both the piston 12 and valve part 40 are at the extreme left end of the motor. The compartments 22 and 24 being interconnected, air passes from the compartment 24 into the compartment 22, thereby reducing the differential of pressures acting upon the piston 12. The clutch springs then function to move the piston to the right, thereby moving the driven clutch plate connected thereto toward its clutch engaged position. The movement of the piston is, however, stopped when the clutch plates contact very lightly with each other. This operation is effected by virtue of the lapping of the control valve, the valve parts taking the relative positions disclosed in Figure 3. It will be noted that in this position the full-bodied end portion of the spool-shaped valve member 40 serves to cover up the ports 38 of the valve part 34, thereby cutting off the flow of air from the compartment 24 to the compartment 22. Now the parts of the clutch control mechanism of my invention are so constructed and arranged that this valve lapping operation is effected very quickly and at the same time or substantially the same time as the above described lost motion in the throttle linkage is taken up. The parts of the mechanism, including the yieldable connection between the accelerator and the lug 56, are also so constructed and arranged that in effecting the aforementioned lost motion movement of the accelerator the lever 48 is rotated to take up a space, indicated by the letter S, Figure 1, between the pin 94 and the upper end of said lever and also further compress the spring 58. This additional compression of the spring 58 is made possible by virtue of the fact that said spring is weaker than the spring 90 of the stop means 64. This compression then, is effected after the lever 48 contacts the pin 86 and as the control valve 34, 40 is carrying out the above described follow-up-to-lap operation. It follows therefore that the degree of movement of the valve part 40, which in large measure determines the degree of loading of the clutch plates when the first stage of movement of the driven clutch plate has been completed, is determined by the adjustment of the pin 86. It is assumed that with a normal operation of the accelerator, the driver, by virtue of the progressively increasing resistance of the compression spring 58 and the progressively increasing resistance of the spring 66, will involuntarily slow up the depression of the accelerator just before the throttle is opened. It follows therefore by virtue of this slowing up of the accelerator, the follow-up operation of the valve 34, 40 when the spring 58 is being compressed, the speed of operation of the motor 10 in effecting the first stage of movement of the piston 12 and a possible momentary stopping of the movement of the accelerator when the resistance of the throttle spring 102 is encountered; that in all probability said first stage movement of the piston will be completed before the hereinafter described stop mechanism 64 is moved to initiate the second stage operation of said piston.

The clutch plates having been brought into light contact with each other by the first stage operation of the motor 10, a continued depression of the accelerator will serve to initiate the second stage operation of the motor 10 by opening the throttle, thereby increasing the speed of the engine and operating the governor 66 to move the lever 82 counterclockwise, Figure 1. This operation serves to permit the spring 58 to expand, thereby continuing the clockwise rotation of the lever 48 to again move the valve part 40 to the position with respect to the valve part 34 as disclosed in Figure 2. This operation then effects a further clutch engaging movement of the piston 12.

It will therefore be apparent that the force exerted by the clutch spring operated driven clutch plate against the driving clutch plate will be directly proportional to the speed of the internal combustion engine of the vehicle, that is the torque of said engine; for the degree of control movement of the stop means 64 is directly proportional to the speed of the engine operated governor 67 and said movement results, by virtue of the expansion of the accelerator operated spring 58, in a corresponding clutch engaging movement of the valve part 40. If the driver, by depressing the accelerator, opens the throttle a small amount, and then holds the accelerator in this position, the valve part 40 will be moved a corresponding distance whereupon, by virtue of the aforementioned by-passing of air from one motor compartment to the other, the piston 12 and the valve part 34 will move, that is follow up to lap the valve 34, 40. This follow-up operation of the valve results in an increase in the loading of the clutch plates which of course results in an increase in the acceleration of the vehicle. Subsequent further increments of throttle opening movement of the accelerator result in corresponding increases in the acceleration of the vehicle. This maneuvering operation of the clutch control mechanism is particularly advantageous when the driver is desirous of parking the car along the curb of the street.

Having completed the engagement of the clutch, that is having depressed the accelerator sufficiently far to effect the maximum loading of the clutch plates, the piston 12 and valve members 34 and 40 take the relative positions disclosed in Figure 2. The gaseous pressures in the motor compartments 22 and 24 are then equal and the piston 12 is located near the right end plate of the motor.

Continuing the description of the operation of the vehicle in getting the same under way, as described thus far the transmission is established in low gear and the clutch is reengaged. The driver then leaves the transmission in low gear until the desired vehicle speed is attained whereupon he releases the accelerator, thereby automatically effecting the above described clutch disengaging operation of the motor 10; for it will be remembered that the three-way cut-out valve 32 is at this time, and at all times except when the transmission is in high gear and the vehicle is travelling above governor speed, operative to maintain the vacuum connection between the intake manifold and the motor compartment 22, or in other words, render the clutch operating power means operable.

After the clutch is again disengaged the driver then places the transmission in another gear ratio setting whereupon he again depresses the accelerator to effect an engagement of the clutch and an opening of the throttle. Inasmuch as the two-stage clutch engaging operation of the mechanism has been described above, a description of said operation will not be repeated. By repeating the above described operations the driver ultimately establishes the transmission in its highest gear ratio setting and, as described above, the sudden engagement of the friction clutch, effected immediately after the transmission is established in this setting, is offset by the yielding action of the fluid coupling together with the speeding up of the engine which is usually done immediately after the high gear setting of the transmission is completed. This sudden engagement of the clutch, caused by the dumping of air into the motor compartment 22 when the valve mechanism 32 is in its cut-off position disclosed in Figure 2, may be, to a more or less degree, obviated by making the size of an opening 110 relatively small. This opening 110 is provided in a cap 111 mounted on the body of the valve 32, said cap covering the aforementioned port 63. The rate of flow of air into the compartment 22 is then relatively low thereby effecting a relatively low rate of clutch engaging movement of the piston 12.

There is thus provided, by the fluid coupling and the friction clutch operating power means of my invention, or solely by the latter means, a mechanism operative to effect a smooth and substantially effortless operation of the power plant of the vehicle; for except when the vehicle is travelling in high gear above governor speed or when it is desirable to disengage the friction clutch before cranking the engine, there is no need for a manual operation of the friction clutch and after the vehicle is under way the only controls which are operated by the driver are the transmission operating shifter lever and the accelerator. It is also to be noted that when the power plant includes both a fluid coupling and my accelerator operated and governor controlled clutch control mechanism, it is not necessary, with ordinary driving, to place the transmission in any intermediate gear ratio setting. The transmission may even be left meshed in its high gear setting when the vehicle is brought to a stop with the engine idling; for the friction clutch is then disengaged, thereby disengaging the engine from the transmission and preventing any creeping of the vehicle which would, by virtue of the operation of the fluid coupling, take place if said friction clutch were not then disengaged. The friction clutch control mechanism of my invention insures a smooth start of the vehicle from rest and enables the driver to accurately simulate a coordinated manual control of the accelerator and friction clutch when parking the car and when it is necessary to slip the clutch in starting the car from rest when the car is mired; for with the mechanism of my invention the degree of clutch plate loading to effect a slipping clutch is directly proportional to the torque of the engine and for all practical purposes directly proportional to the degree of depression of the accelerator.

While one illustrative embodiment has been described, it is not my intention to limit the scope of the invention to that particular embodiment, or otherwise than by the terms of the appended claims.

I claim:
1. In an automotive vehicle provided with an internal combustion engine, a governor driven by said engine, a throttle, an accelerator and a friction clutch having a driving plate and a driven plate; power means for operating said clutch comprising a pressure differential operated motor having its power element operably connected to the driving element of the clutch, valve means for controlling the operation of said motor including two relatively movable members, and means for operating the throttle and one of said valve members comprising force transmitting means interconnecting said member with the accelerator and governor, said force transmitting means being so constructed as to effect, when the accelerator is depressed a predetermined amount and before the throttle is opened, an operation of the valve mechanism to effect a first stage clutch engaging operation of said motor, said force transmitting means being also so constructed as to effect, by virtue of the operation of the governor, a second stage clutch engaging operation of said motor.

2. In an automotive vehicle provided with an internal combustion engine, a governor driven by said engine, a throttle, a friction clutch having a driving plate and a driven plate, and an accelerator; power means for operating said clutch comprising a pressure differential operated motor having its power element operably connected to the driving element of the clutch, valve means for controlling the operation of said motor including two relatively movable members and means for operating the throttle and one of said valve members comprising force transmitting means, having a lost motion connection therein, interconnecting the throttle and accelerator and other force transmitting means interconnecting said valve member with the accelerator and governor the latter force transmitting means including a plurality of levers one of said levers being operated by the accelerator and the other of said levers serving as a stop for the accelerator operated lever and being operated by the governor, the aforementioned mechanism being so constructed and arranged as to effect, when the accelerator is depressed a predetermined amount and before the throttle is opened, an operation of the valve mechanism to effect a first stage clutch engaging operation of said motor, said mechanism being also so constructed and arranged as to effect, by virtue of the operation of the governor, a second stage clutch engaging operation of said motor.

3. A mechanism for disengaging and controlling the engagement of the friction clutch of the power plant of an automotive vehicle said power plant also including an accelerator and an internal combustion engine having an intake manifold, said mechanism including a pressure differential operated motor having its power element operably connected to the driving element of said clutch, a fluid transmitting conduit interconnecting the manifold with one end of said motor, a follow-up valve mechanism, including two relatively movable parts, for controlling the operation of said motor, an engine speed responsive governor and force transmitting means interconnecting one of the aforementioned parts of said valve mechanism, the accelerator and the governor, said force transmitting means including a spring, actuated by means connected to the accelerator, for so moving the valve part connected to said force transmitting means as to effect a relatively fast first stage clutch engaging movement of the power element, and further including means actuated by the governor and serving to so control the movement of the aforementioned accelerator actuated means as to effect a second stage clutch engaging movement of the power element.

4. A mechanism for disengaging and controlling the engagement of the friction clutch of the power plant of an automotive vehicle said power plant also including an accelerator and an internal combustion engine having an intake manifold, said mechanism including a pressure differential operated motor having its power element operably connected to the driving element of said clutch, a fluid transmitting conduit interconnecting the manifold with one end of said motor, a follow-up valve mechanism, including two relatively movable parts, for controlling the operation of said motor, an engine speed responsive governor and force transmitting means interconnecting one of the aforementioned parts of said valve mechanism, the accelerator and the governor, said force transmitting means including a lever, actuated by means connected to the accelerator, for so moving the valve part connected to said force transmitting means as to effect a relatively fast first stage clutch engaging movement of the power element, and further including another lever actuated by the governor and serving to so control the movement of the aforementioned accelerator actuated lever as to effect a second stage clutch engaging movement of the power element.

5. In an automotive vehicle provided with an internal combustion engine, an accelerator and a friction clutch, power means for effecting a disengagement of said clutch and for controlling the engagement thereof, said power means including a pressure differential operated motor, a two-part valve mechanism for controlling the operation of said motor, an engine operated governor and force transmitting means interconnecting one of the parts of said valve mechanism, the accelerator and the governor, said force transmitting means including means actuated by the accelerator for moving the valve part to thereby control the operation of the motor and further including a movable stop, actuated by the governor for controlling the movement of the aforementioned accelerator actuated means for moving said valve part.

6. In an automotive vehicle provided with an internal combustion engine, an accelerator and a friction clutch, power means for effecting a disengagement of said clutch and for controlling the engagement thereof, said power means including a pressure differential operated motor, a two-part follow-up valve mechanism for controlling the operation of said motor, an engine operated governor and force transmitting means interconnecting one of the parts of said valve mechanism, the accelerator and the governor, said force transmitting means including a lever, means, including a spring, interconnecting said lever with the accelerator for moving the valve part to thereby control the operation of the motor and further including a movable stop, the latter being actuated by the governor for controlling the movement of the aforementioned lever.

7. In an automotive vehicle provided with an internal combustion engine having an intake manifold, an accelerator and a friction clutch, power means for effecting a disengagement of said clutch and for controlling the engagement thereof, said power means including an engine operated governor, a double ended double acting pressure differential operated motor operably connected to the clutch, said motor having two compartments, fluid transmitting means interconnecting one of said compartments with the intake manifold, a two-part follow-up valve mechanism for venting the other of said compartments to the atmosphere to effect a clutch disengaging operation of said motor and for controlling the by-passing of air from one compartment to the other to effect a clutch engaging operation of said motor, accelerator actuated means for moving one of the parts of said valve mechanism in either one or the other of two directions to thereby control the operation of said motor, and means actuated by the engine operated governor for controlling the operation of the aforementioned accelerator actuated means for moving said valve part.

8. In an automotive vehicle provided with an internal combustion engine, an accelerator, a throttle and a friction clutch including a driven plate and a clutch plate, power means for effecting a clutch disengaging movement of the driven plate and for so controlling the operation of the clutch spring as to effect two stages of clutch engaging movement of the said plate, said power means comprising an engine operated governor, a pressure differential operated motor, a two-part follow-up valve for controlling the operation of said motor, means actuated by the accelerator for operating the throttle and operating one of the parts of said valve and means, including a yieldable stop, the latter being actuated by said governor and operative to control the operation of that portion of the aforementioned means serving to operate the aforementioned valve part.

9. In an automotive vehicle provided with an internal combustion engine, an accelerator, a throttle and a friction clutch including a driven plate and a clutch plate, power means for effecting a disengaging movement of the driven plate and for so controlling the operation of the clutch spring as to effect two stages of clutch engaging movement of said plate said power means comprising an engine operated governor, a pressure differential operated motor, valve means, including a two-part follow-up valve, for controlling the operation of said motor, means actuated by the accelerator, including a lever and yieldable means interconnecting the accelerator and lever, for operating the throttle and also operating one of the parts of said valve, and means, including a yieldable stop, actuated by said governor and operative to control the operation of that portion of the aforementioned means serving to operate the aforementioned valve part.

HAROLD W. PRICE.

REFERENCES CITED

The following references are of record in the file of this patent:

UNITED STATES PATENTS

| Number | Name | Date |
| --- | --- | --- |
| 2,118,123 | Watts | May 24, 1938 |
| 2,227,274 | Price et al. | Dec. 31, 1940 |
| 2,296,282 | Hruska | Sept. 22, 1942 |
| 2,273,277 | Leukhardt | Feb. 17, 1942 |